Aug. 16, 1960  H. C. WATERMAN  2,949,573
INVERTER HAVING VOLTAGE REGULATED OUTPUT
Filed Jan. 8, 1957
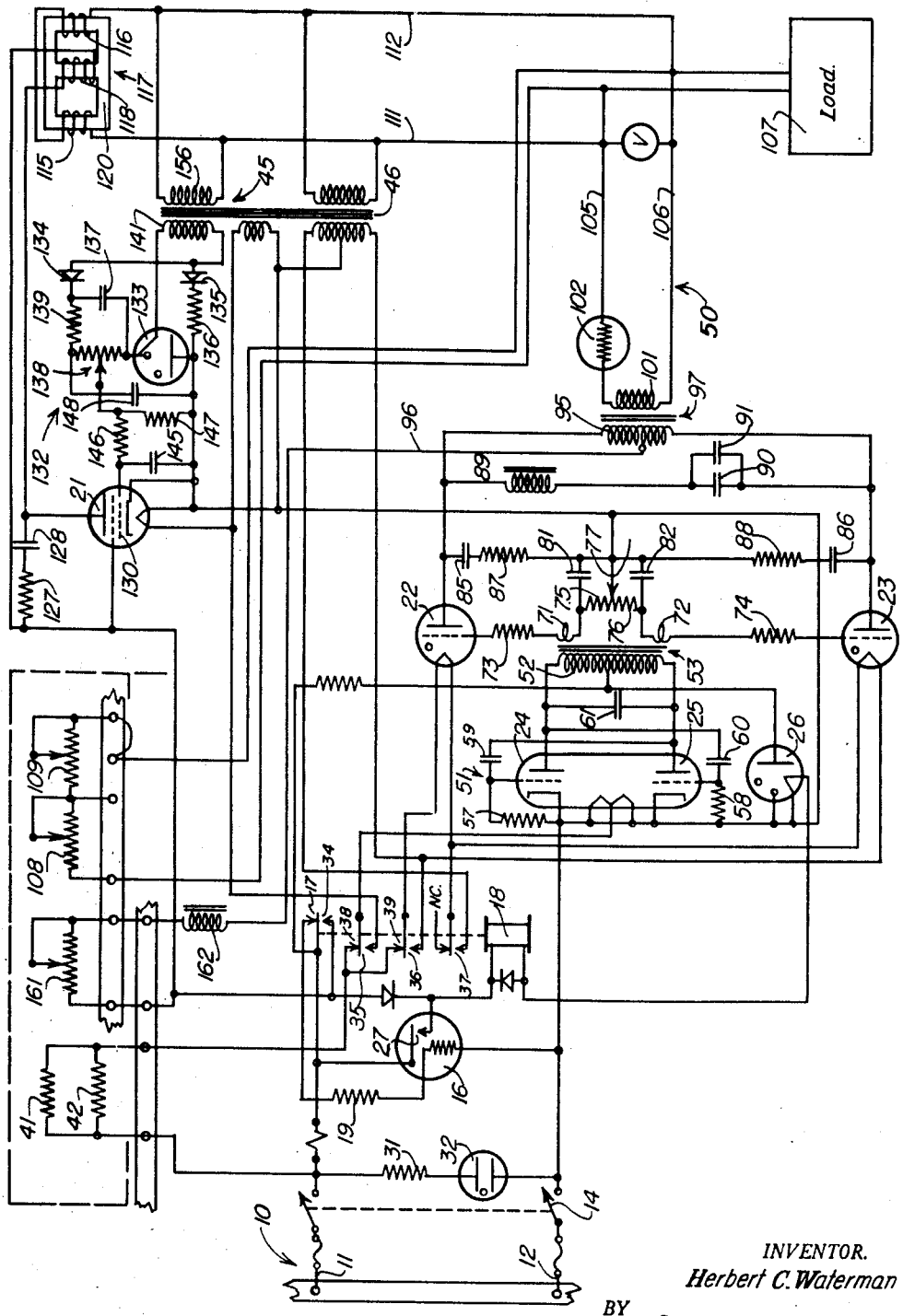
INVENTOR.
Herbert C. Waterman
BY
Mueller & Aichele
Attys.

United States Patent Office
2,949,573
Patented Aug. 16, 1960

2,949,573
INVERTER HAVING VOLTAGE REGULATED OUTPUT

Herbert C. Waterman, Chicago, Ill., assignor to Motorola, Inc., a corporation of Illinois Filed Jan. 8, 1957, Ser. No. 633,021

4 Claims. (Cl. 321—19)

This invention relates to an electronic energy connecting device and more particularly to an inverter having a voltage regulated output.

In an inverter where the direct current power supply energizes an oscillator circuit to produce an alternating current output, voltage regulation of the output has been a problem. This has been particularly true where the voltage of the direct current source varies from the nominal voltage thereof and also when the load placed on the output varies substantially. Although saturable reactors have been used to provide voltage regulation, to be of substantial effect a saturable reactor must be very large and it then introduces large losses which greatly reduce the efficiency. Also, where the oscillator circuit has been of the push-pull type, it has been difficult to balance the output thereof.

One object of the invention is to provide voltage regulating apparatus having low power losses.

Another object of the invention is to provide an inverter including a push-pull oscillator circuit having a balanced output.

A further object of the invention is to provide voltage regulating apparatus compensating for changes in voltage of the direct current supply and also compensating for changes in the load.

Still another object of the invention is to provide an inverter for operation from a variable input voltage with voltage regulating apparatus compensating for the variations in the input voltage.

A still further object of the invention is to provide an inverter which is adjustable for varying load conditions.

One feature of the invention is the provision of voltage regulating apparatus including a non-linear temperature responsive resistor in series with the output and a saturable reactor connected in shunt across the output.

Another feature of the invention is the provision of an inverter circuit adapted to operate from a variable input voltage source and having an output line with a non-linear temperature-responsive resistor in series therewith and a saturable reactor in shunt with the output line, together with means responsive to the voltage across the output line for controlling the impedance of the saturable reactor.

Yet another feature of the invention is the provision of an oscillator controlling circuit having a transformer with a divided output winding for controlling the oscillations of a pair of thyratron tubes, a potentiometer connected to the ends of the divided winding and a pair of capacitors to form long time constant circuits with the ends of the potentiometer to compensate for any unbalance in the output waveform of the inverter.

In the drawings, the single figure is a diagrammatic view of an inverter forming one embodiment of the invention.

The invention provides an inverter including a push-pull control oscillator having an output transformer with two output windings connected together by a potentiometer, the slider of which is connected to a reference voltage point. Capacitors also are connected to the ends of the potentiometer and to the reference voltage points to form long time constant circuits with the portions of the potentiometer on each side of the slider for biasing the control grids of the thyratron tubes. The thyratron tubes are connected in push-pull relationship with respect to an output transformer forming an alternating current source for an output line.

A non-linear temperature-responsive resistor such as, for example, a barreter, is connected in series with the output line for offering a resistance non-linearly responsive to current therethrough which tends to lessen the voltage variations of the output line. A saturable reactor connected in shunt across the output line acts with the resistor to regulate the voltage of the output line. A circuit responsive to the output line voltage varies the reactance of the saturable reactor. Hence, a small temperature-sensitive resistor and a small saturable reactor may be used to effectively regulate the voltage of the output line without causing as high losses therein as are caused when the same regulation scheme is used except that the resistor is fixed and the saturable reactor is larger as required by the use of a fixed resistor. A variable resistor may be connected across the output line for adjusting the load on the line so that the inverter may be satisfactorily used with any of several widely different average loads.

In the inverter shown in the drawings, there is provided a direct current voltage source 10 having a positive conductor 11 and a negative conductor 12. The voltage source is a nominal 129 volts direct current source but the voltage of this source may vary from about 100 volts to about 150 volts. A switch 14 is provided in the input line, and when it is closed, power is supplied through resistor 19 to a thermal relay 16, through normally closed contacts 17 of a relay 18. The thermal relay 16 is of a well known type, and after a predetermined delay sufficient for filaments of tubes 22, 23, 24 and 25 to be heated, the relay closes contacts 27 for energizing the winding of the relay 18. A resistor 31 and a gas-filled pilot light 32 are provided across the input line.

When the contacts 27 of the relay 16 are closed and the relay 18 is energized, the contacts 17, 38 and 39 are opened and contacts 34, 35, 36 and 37 are closed. From the time the switch 14 is closed manually to the time of operation of the relay 18, power is supplied to the filaments of tubes 22–25 from the voltage source 10 through the contacts 38 and 39 of the relay 18 and resistors 41 and 42. However, after the operation of the relay 18 at the end of the warmup delay provided by the thermal relay 16, power for the several filaments is supplied thereto through contacts 35, 36 and 37 from transformers 45 and 46 which are supplied with power from the output of the inverter.

The inverter includes a push-pull control oscillator 51 including the vacuum tubes 24 and 25, and plate voltage for the vacuum tubes 24 and 25 is supplied through a tapped primary winding 52 of a transformer 53, which forms the output of the control oscillator circuit. Capacitors 59 and 60 provide multivibrator coupling between tubes 24 and 25 and with resistors 57 and 58 form time constant resistance-capacitance circuits which, along with capacitor 61 and the primary winding of the transformer 53, cause the control oscillator 51 to oscillate at a desired frequency. In the illustration described, the frequency of oscillation is 65 cycles per second.

Output or secondary windings 71 and 72 of the transformer 53 are connected by resistors 73 and 74 to grids of the tubes 22 and 23, and alternately prevent and allow firing of the thyratron tubes 22 and 23. The adjacent ends of the windings 71 and 72 are connected to a resistor portion 75 of a potentiometer 76. The potentiometer has a slider 77 adjustable along the resistor portion 75 and connected to the negative conductor 12 of the voltage source 10, which forms a reference voltage point. Capacitors 81 and 82 are connected also to the ends of the resistor portion 75 to form grid-leak time constant circuits with the respective parts of the resistor portion 75 adjacent thereto. By adjusting the slider 77 along the resistor portion 75 the relative firing time of the tubes 22 and 23 may be made symmetrical so that a more perfect output sine wave is produced thereby.

Capacitors 85 and 86 are connected in series with resistors 87 and 88, respectively, to the plates of the tubes 22 and 23, and an inductor 89 is connected in series with parallel capacitors 90 and 91 between the plates of the tubes 22 and 23. A tapped primary winding 95 of transformer 97 supplies anode voltage to the thyratron tubes 22 and 23 from a conductor 96 connected through inductor 162 and resistor 161 to the positive conductor 11 of the direct current voltage source 10 and to the midpoint of the winding 95 to connect the thyratron tubes 22 and 23 in push-pull relationship. Filaments of the tubes 22 and 23 are connected to the transformer 46 through the relay contacts 36 and 37.

The primary winding 95 of the transformer 97 energizes the secondary winding 101 which supplies alternating current voltage to the output line 50. A barreter 102 is connected in a series with the output line to effect partial voltage regulation on the output line. The barreter 102 is a well-known type of non-linear temperature-responsive resistor. The output line 50 includes conductors 105 and 106 leading to a load 107, and variable resistors 108 and 109 are connected across the output line to load the inverter to adapt it to any one of several loads of widely varying average magnitudes. Lines 111 and 112 supply power to the transformers 45 and 46 and also supply power to series-connected, oppositely wound windings 115 and 116 of a saturable reactor 117 having a control winding 118. The saturable reactor 117 is of a type well known in the art.

Current is drained from the output line 50 by the saturable reactor 117 in accordance with the potential across the conductors 105 and 106 beyond the temperature-sensitive resistor 102. The impedance offered by reactor 117 to the output line 50 is controlled by the current flow through the winding 118, which controls the degree of saturation of a core 120. The winding 118 is connected at one end to the positive conductor 11 of the power source 10 through the contacts 34. A resistor 127 and a capacitor 128 in series therewith are connected across the winding 118 to provide an alternating current path between the ends of the winding 118, thereby reducing short duration high voltage pulses generated in winding 118, caused by inherent imperfections in saturable reactor 117, and occuring at the same rate as the polarity reversals of windings 115 and 116.

The degree of saturation of the core 120 is determined by the current flowing through the winding 118 which in turn is controlled by the plate current flowing through the vacuum tube 21. The plate current flowing through the vacuum tube 21 is controlled by a control grid 130 which is controlled by a control circuit 132 including a gas-filled constant voltage reference tube 133, rectifiers 134 and 135, a resistor 136, a capacitor 137, a potentiometer 138 acting as a voltage divider, and a resistor 139. The circuit 132 is supplied with voltage from a secondary winding 141 of the transformer 45 in proportion to the voltage across the output line 50. Thus the voltage between the control grid 130 of the tube 21 and the cathode thereof is made proportional to the voltage on the output line 50. A capacitor 145 is connected between the control grid 130 and the cathode of the tube 21 and a series resistor 146 connects the grid 130 to the slider of the potentiometer 138 and a resistor 147 is connected between the cathode of the tube 21 and the juncture of the resistor 146 and the slider of the potentiometer 138. A capacitor 148 is connected to the juncture of the potentiometer 138 and resistor 139 and to the cathode of the tube 21.

When the voltage across the conductors 105 and 106 of the output line 50 tends to rise and thereby cause an increase in output current, the resistance of the temperature-responsive resistor 102 increases to cut down the voltage across the output line partially by its own action. The increase in voltage across primary winding 156 of the transformer 45 increases to cause an increase in the voltage across potentiometer 138, which raises the voltage on the grid 130 and causes the tube 21 to be more conductive. This, in turn, causes a higher current to flow through the saturating winding 118 of the reactor 117 to bring the core 120 closer to saturation so that less impedance to flow of current through the windings 115 and 116 is offered by the reactor 117. Hence, a higher current flows through the windings 115 and 116 shunting the output line 50 to a greater extent to cause a further increase in voltage drop across temperature sensitive resistor 102, and this reduces the voltage increase applied to the load 107 over what it otherwise would be. Thus, the temperature-responsive resistor 102 and the saturable reactor 117 tend to keep the voltage across the conductors 105 and 106 substantially constant regardless of wide variations in the voltage of the power source 10 and in the load 107. The variation in voltage across the conductors 105 and 106 is kept within less than ten percent by these elements when the supply voltage varies from 100 to 150 volts D.C.

The following circuit constants are given solely by way of example and are not intended to limit the scope of the invention in any way:

| | |
|---|---|
| Resistor 31 | 560 kilohms. |
| Resistor 19 | 1800 ohms. |
| Resistor 41 | 24 ohms. |
| Resistor 42 | 24 ohms. |
| Resistor 57 | 390 kilohms. |
| Resistor 58 | 390 kilohms. |
| Resistor 74 | 56 kilohms. |
| Resistor 73 | 56 kilohms. |
| Resistor 87 | 400 ohms. |
| Resistor 88 | 400 ohms. |
| Resistor 102 | 4 to 10 ohms (temperature sensitive). |
| Resistor 108 | 300 ohms. |
| Resistor 109 | 300 ohms. |
| Resistor 161 | 3 ohms. |
| Resistor 127 | 1 kilohm. |
| Resistor 146 | 470 kilohms. |
| Resistor 147 | 150 kilohms. |
| Resistor 139 | 10 kilohms. |
| Resistor 136 | 15 kilohms. |
| Capacitor 59 | .02 microfarads. |
| Capacitor 60 | .02 microfarads. |
| Capacitor 61 | .17 microfarads. |
| Capacitor 81 | 0.1 microfarad. |
| Capacitor 82 | 0.1 microfarad. |
| Capacitor 86 | .25 microfarad. |
| Capacitor 90 | 10 micromicrofarads. |
| Capacitor 91 | 10 micromicrofarads. |
| Capacitor 145 | .02 microfarad. |
| Capacitor 148 | 1 micromicrofarad. |
| Capacitor 137 | 1 micromicrofarad. |
| Capacitor 128 | .5 microfarads. |
| Transformer 53 | Primary 7,000 Ω CT @ 10 ma. Ratio ½ pri. to each sec. 1:3. |
| Core 117 | Standard transformer "A" grade E–I laminations 3⅝" x 4½" 100% interleaved, 1.1 in.² area. |
| Winding 116 | 247 turns #19 copper wire. |
| Winding 115 | 247 turns #19 copper wire. |
| Winding 118 | 10,500 turns #34 copper wire. |
| Coil 89 | 9.5 millihenries. |
| Coil 162 | 3" stack standard transformer "A" grade E–I laminations 4⅛" x 4⅞", butt joint, and 250 turns #16 copper wire. |

The above described inverter produces a virtually undistorted sine wave alternating current output. This is made possible by the adjustable resistance-capacitance networks formed by the potentiometer 76 and the capacitors 81 and 82 connected between the windings 71 and 72 to achieve near perfect balance in the output of the thyratron tubes 22 and 23. The combination of the barreter 102 and the saturable reactor 117 controlled by the circuit 132 act together to regulate the voltage across the output line conductors 105 and 106 with much less power loss than there would be if the same regulation scheme is used except that the resistor is fixed and the saturable reactor is larger as required by the use of a fixed resistor, or if only a very large barreter or only a very large saturable reactor were used to effect voltage regulation, and the cost of the barreter and the reactor 117 along with the control elements for the reactor 117 is much less than that of such a large reactor or a large barreter.

I claim:

1. An inverter circuit for operation from direct current power supply means including in combination, push-pull oscillator means energized by the power supply means and having a pair of output windings, an output transformer having primary and secondary windings, said primary winding having end terminals and a center terminal connected to the power supply means, a pair of thyratron tubes connected in push-pull with the primary winding of said output transformer, said tubes having output electrodes connected to said end terminals of said primary winding and having control grids connected to one end of each of said output windings, a potentiometer having a resistor portion connecting the other ends of said output windings and also having a slider connected to one side of said power supply means, capacitor means connecting the ends of said resistor portion to said slider, a barreter connected serially with the secondary winding of said output transformer, said barreter having increased resistance as the current therethrough increases, a saturable reactor having a control winding and also being provided with a pair of windings connected in series with one another and across said barreter and said secondary winding of said output transformer, and means responsive to the output voltage of said output transformer for controlling current through said control winding so that the impedance of said pair of windings is reduced and the current through said windings and through said barreter is increased to increase the voltage drop across said barreter.

2. An inverter circuit for operation from direct current power supply means including in combination, push-pull oscillator means energized by said power supply means and having a pair of output windings, an output transformer having primary and secondary windings, said primary winding having end terminals and a center terminal connected to the power supply means, a pair of power tubes connected in push-pull relationship with the primary winding of said output transformer, said tubes having output electrodes connected to said end terminals of said primary winding and having control grids connected to one end of each of said output windings, a potentiometer having a resistor portion connecting the other ends of said output windings and also having a slider connected to one side of said power supply means, capacitor means connecting the ends of said resistor portion to said slider, a pair of output terminals, a barreter connected in series with the secondary winding of said output transformer to said output terminals, a saturable reactor having a control winding and also being provided with a pair of windings connected in series with one another and across said output terminals, means responsive to the voltage across said output terminals for controlling current through said control winding, and variable resistance means connected in parallel with said output terminals, whereby an increase in voltage across said output terminals causes an increase in current through said barreter and increases the voltage drop thereacross.

3. A voltage regulator system for alternating current supply means having first and second terminals for supplying current to a load, and with the voltage across said terminals tending to vary, said regulator system including means forming first and second current supply paths for connection respectively to the terminals of the supply means and each having an output conductor for connection to the load, one of said supply paths including resistor means connected in series therein having a resistance which increases with increase in the current flowing therethrough, saturable reactor means including a control winding and variable impedance winding means, means connecting said variable impedance winding means between said output conductors so that current drawn from the supply means by said winding means flows through said resistor means, and control circuit means connected to said supply conductors for supplying current to said control winding which varies in the same sense with change in voltage across said supply conductors to cause the impedance of said winding means to vary in the opposite sense and thereby change the current therethrough in the same sense as the variation in current through said control winding, and with such changed current flowing through said resistor means to change the voltage drop thereacross in the same sense and thereby change the voltage at said output conductors in the opposite sense.

4. A voltage regulator system for alternating current supply apparatus having first and second terminals for supplying current to a load, and with the voltage across said terminals tending to vary during operation of said apparatus and because of changes in the load, said regulator system including means forming first and second current supply paths for connection respectively to the terminals of the supply apparatus and each having an output conductor for connection to the load, one of said supply paths including resistor means connected in series therein having a resistance which increases with increase in the current flowing therethrough, saturable reactor means including a control winding and variable impedance winding means, means connecting said variable impedance winding means between said output conductors so that current drawn from the supply apparatus by said winding means flows through said resistor means, and control circuit means connected to said supply conductors for supplying current to said control winding, said control circuit means including reference voltage means and being responsive to increase in the voltage across said supply conductors to change the current in said control winding and thereby reduce the impedance of said winding means, said reduced impedance of said winding means acting to increase the current therethrough and to thereby increase the current flowing through said resistor means to increase the voltage drop thereacross and correspondingly reduce the voltage at said output conductors.

References Cited in the file of this patent

UNITED STATES PATENTS

| | | |
|---|---|---|
| 1,834,416 | Osgood | Dec. 1, 1931 |
| 2,025,911 | Stansbury | Dec. 31, 1935 |
| 2,305,407 | Crago | Dec. 15, 1942 |
| 2,437,837 | Saretzky | Mar. 16, 1948 |
| 2,485,477 | Cotton | Oct. 18, 1949 |
| 2,638,569 | Holt | May 12, 1953 |